United States Patent [19]
Roche et al.

[11] Patent Number: 4,772,956
[45] Date of Patent: Sep. 20, 1988

[54] DUAL BLOCK STILL VIDEO COMPANDER PROCESSOR

[75] Inventors: Vincent T. Roche; Rocco J. Porcellio; Keith A. Hadley, all of Rochester, N.Y.

[73] Assignee: Eastman Kodak Company, Rochester, N.Y.

[21] Appl. No.: 57,585

[22] Filed: Jun. 2, 1987

[51] Int. Cl.[4] ............................................. H04N 7/133
[52] U.S. Cl. ...................................... 358/260; 358/85; 358/133; 358/134; 358/280
[58] Field of Search ................. 358/133, 138, 85, 134, 358/260, 280

[56] References Cited

U.S. PATENT DOCUMENTS

| | | | |
|---|---|---|---|
| 3,883,847 | 5/1975 | Frank | 364/900 |
| 4,044,347 | 8/1977 | Van Voorhis | 340/347 DD |
| 4,091,424 | 5/1978 | Widergren | 358/260 |
| 4,288,782 | 9/1981 | Bader et al. | 382/34 |
| 4,302,775 | 11/1981 | Widergren et al. | 358/136 |
| 4,385,363 | 5/1983 | Widergren et al. | 364/725 |
| 4,394,774 | 7/1983 | Widergren et al. | 382/56 |
| 4,410,916 | 10/1983 | Pratt et al. | 358/263 |
| 4,541,012 | 9/1985 | Tescher | 358/133 |
| 4,549,212 | 10/1985 | Bayer | 358/167 |
| 4,633,441 | 12/1986 | Ishimoto | 365/189 |
| 4,660,177 | 4/1987 | O'Conner | 365/189 |
| 4,689,741 | 8/1987 | Redwine | 364/200 |
| 4,704,628 | 11/1987 | Chen | 358/133 |

OTHER PUBLICATIONS

"Multidimensional Rotations in Feature Selection", by Harry C. Andrews, *IEEE Transactions on Computers*, Sep. 1971.
"Discrete Cosine Transform", by N. Admed et al, *IEEE Transactions on Computers*, Jan. 1974, pp. 90–93.
"A Fast Computational Algorithm for the Discrete Cosine Transform", by Wen-Hsiung Chen et al, *IEEE Transactions on Communications*, vol. Com-25, No. 9, Sep. 1977, pp. 1004–1009.

*Primary Examiner*—Howard W. Britton
*Attorney, Agent, or Firm*—Robert M. Wallace

[57] ABSTRACT

A video transceiver includes a compressor which grabs a pair of blocks of image data from a video frame store and loads them into a dual port memory. A first processor, working through one of the dual ports, performs a portion of an image compression algorithm, while a second processor, working through a second one of the dual ports, performs the remainder of the compression algorithm on each one of the two pairs of blocks, both processors operating in parallel to speed up the entire process. A key word in each block is changed in accordance with each step, so that each of the two processors is prevented from grabbing the wrong one of the two blocks from the dual port memory. The resulting compressed data is queued in a temporary buffer, from which it is returned to another portion of the video frame store in serial fashion, rather than block, in preparation for serial transmission.

21 Claims, 8 Drawing Sheets

*RUN LENGTH CODING*
FIG. 7(c)

*AMPLITUDE CODING*
FIG. 7(d)

DUAL BLOCK STILL VIDEO COMPANDER PROCESSOR

RELATED APPLICATIONS

The subject matter of this application is related to subject matter contained in U.S. patent application Ser. No. 057,066 filed June 2, 1987 by Kathleen Ann Laspada entitled "Still Video Frame Story Memory"; U.S. patent application Ser. No. 057,410 filed June 2, 1987 by C. T. Chen, M. Rabbani and S. J. Daly entitled "Image transmission System with Preview Mode"; U.S. patent application Ser. No. 057,413 filed June 2, 1987 by S. J. Daly, M. Rabbani and C. T. Chen entitled "Digital Image Compression and Transmission System Employing Visually Weighted Transform Coefficients"; U.S. patent application Ser. No. 057,414 filed June 2, 1987 by S. J. Daly, C. T. Chen and M. Rabbani entitled "Adaptive Block Transform Image Coding and Apparatus"; U.S. patent application Ser. No. 057,595 filed June 2, 1987 by Bonnie Jo Schmitt entitled "Still Video Transceiver Processor"; and U.S. patent application Ser. No. 057,596 filed June 2, 1987 by Mojgan Rabbani and Rocco John Porcellio entitled "Image Transmission System with Line Averaging Preview Mode Using Two-Pass Block-Edge Interpolation".

BACKGROUND OF THE INVENTION

Transmission of a high quality video image over a low band-width channel, such as a standard telephone line, is time consuming. The relatively low band-width of a telephone line, and the large band-width of a high quality video image, can dictate transmission times for a single analog video frame on the order of 20 minutes. It has been recognized that one way around such unacceptably long transmission times for a single video frame is to digitize and compress the video signal prior to transmission. Various image data compression techniques are known in the art, including thresholding, normalization, quantization and minimum redundancy encoding.

Thresholding discards data words of magnitudes less than a threshold number. Normalization entails dividing each data word by a divisor to yield a quotient. Quantization discards the fractional bits in the quotient. Minimum redundancy encoding is a technique well-known in the prior art and employs two complimentary steps, namely amplitude encoding and run length encoding. Amplitude encoding (or "Huffman Encoding") simply assigns to each of a finite set of possible amplitudes an encoded bit pattern designed to require the smallest number of bits for non-redundant representation. Run length encoding simply represents any consecutive run of zeros in the data as the smallest non-redundant bit pattern required to count the number of zeros in the run. The set of bit patterns representing each of the possible word amplitudes and the set of bit patterns representing each of the possible zero run lengths may be selected in accordance with the well-known principles and stored in look-up tables for use during the compression process, and need not be described further herein.

It is well-known that compression techniques are greatly enhanced when applied to image data which has been previously transformed in accordance with a discrete cosine transform algorithm. Discrete cosine transforms are well-known in the art of image data compression. They are presently preferred above all other species of transforms because, for a given number of resultant transform coefficients, the variance of the inverse transformed data from its original is smallest when a discrete cosine transform is employed, and is larger whenever any other type of transform is employed for which a discrete algorithm is known, such as a fast-Fourier transform, etc.

These compression techniques greatly reduce the number of bits required to represent a frame of video information, without a proportionate reduction in image quality, thereby reducing the amount of time required to transmit a single video frame.

PROBLEM TO BE SOLVED BY THE INVENTION

The problem is how to further reduce the amount of time required to transmit one video frame over a narrow bandwidth channel such as a telephone line. Even when employing the foregoing image compression techniques, a significant amount of time is consumed simply processing the video data prior to transmission, in addition to the amount of time required to transmit it. In short, to perform a discrete cosine transform on one frame of high quality video data (comprising, for example, 512 rows of pixels by 512 columns of pixels) and to then perform thresholding, normalization, quantization and minimum redundancy encoding on the resulting transform coefficients requires significant processing time. Each of these compression steps must be performed in serial order. Thus, it would seem that the minimum pre-transmission processing time is simply the sum of the time required to perform each of these compression steps.

It is the object of the present invention to overcome this seeming limitation and further reduce the amount of time required to completely compress one frame of high quality video data, without skipping any of the foregoing compression steps.

SUMMARY OF THE INVENTION

Solution To The Problem

The invention is an improved video transceiver, and includes a dual block video compressor processor. This compressor processor includes dual processors and a dual port memory. The task of image compression is divided into two parts, which are allocated to respective ones of the dual processors. The compression processor grabs successive pairs of a series of square (or rectangular) blocks of image data stored in a frame store memory, stores them in the dual port memory and appends a key word to each of them in the dual port memory. The dual processors access the pair of blocks through the different ports of the dual port memory. Each key word is changed uniquely by each of the dual processors as it processes the respective block. Each of the dual processors responds to the state of the key word of each one of the pair of blocks in such a manner as to avoid grabbing the wrong one of the pair of blocks out of sequence. The key word appended to each of the pair of blocks thus protects its respective block from being processed out of sequence by either one of the dual processors. The resulting compressed video data is loaded into a temporary buffer. The temporary buffer is periodically unloaded into a reserved portion of the frame store memory called the compressed image buffer.

Additional Problem and Its Solution

The density of the compressed video data varies, depending upon the image content of each portion of the video frame, giving rise to deleterious "gaps" in the data, a potentially significant problem. The random lengths of compressed data are queued together in a serial continuum in the temporary buffer (thereby closing such gaps), thus permitting the compressed image buffer to be addressed and the data loaded therein in a smooth, efficient manner. The temporary buffer provides data byte-by-byte to the compressed image buffer, for easy addressing.

Dual Processors

In one embodiment of the invention, one of the dual processors within the compression processor is a digital signal processor ("DSP") programmed to perform the discrete cosine transform portion of the compression algorithm, while the other of the dual processors is a microprocessor programmed to perform block-to-serial conversion of the discrete cosine transform coefficients generated by the digital signal processor. The microprocessor is further programmed to perform thresholding, normalization, quantization and minimum redundancy encoding. Alternative allocations of the compression algorithm among the dual processors are possible. For example, the digital signal processor may be programmed to perform the discrete cosine transform, the block-to-serial conversion, thresholding, normalization and quantization, leaving only the minimum redundancy encoding to be performed by the microprocessor.

One of the dual processors must, in addition, perform data management, controlling the addressing of the frame store memory and operation of the temporary buffer. In the preferred embodiment, the microprocessor performs data management.

DESCRIPTION OF THE DRAWINGS

The invention is described in detail with reference to the accompanying drawings, of which:

FIG. 7b is a flow diagram illustrating the use of a temporary buffer in the encoding operation of FIG. 7a;

FIG. 7c is a block diagram illustrating a run length encoding process performed in the encoding operation of FIG. 7a; and FIG. 7d is a block diagram illustrating an amplitude encoding process performed in the encoding operation of FIG. 7a.

DETAILED DESCRIPTION

Video Signal Compression

Figure 1:
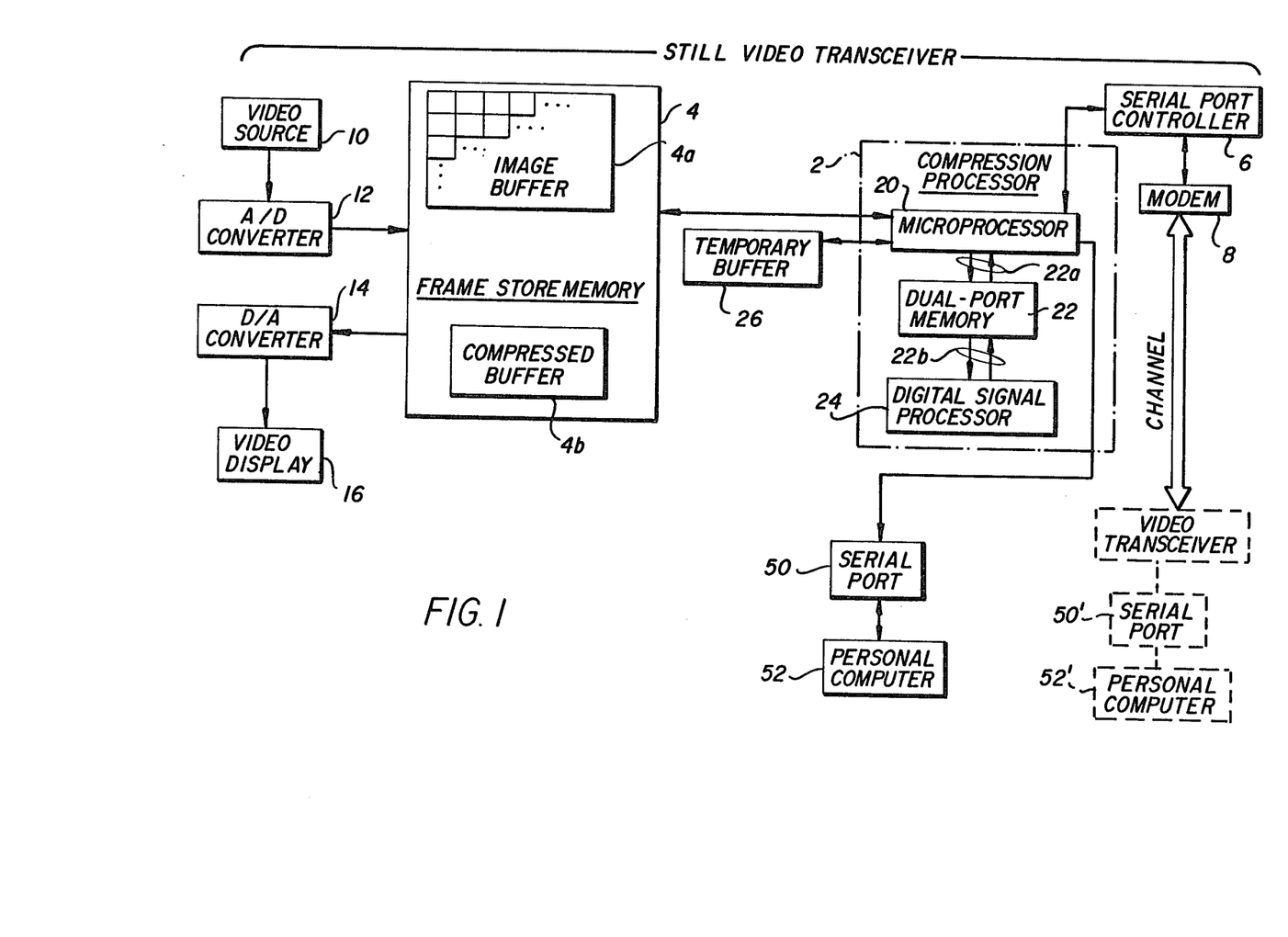
FIG. 1 is a block diagram illustrating a video transceiver embodying the invention.

Referring to FIG. 1, the video transceiver of the invention includes a compression processor 2 which compresses video data received from a video frame store memory 4 and furnishes the compressed data to a serial port controller 6 for modulation in a modem 8 and transmission over an external channel. The video data stored in the frame store memory 4 was first received from a video source 10 and converted to digital bits by an analog-to-digital converter 12 before being loaded into the frame store memory 4. The video transceiver of FIG. 1 may operate as either a transmitter or receiver. As a receiver, it receives compressed video data over the external channel, demodulates the data in the modem 8 and decompresses the data in the compression processor 2 (which may function also as an expansion processor). After the compression processor 2 expands the received video data, it stores the data in the frame store memory 4. The expanded data may then be read out through a digital-to-analog converter 14 and the resulting analog signal may be viewed on a video display 16.

Figure 2:
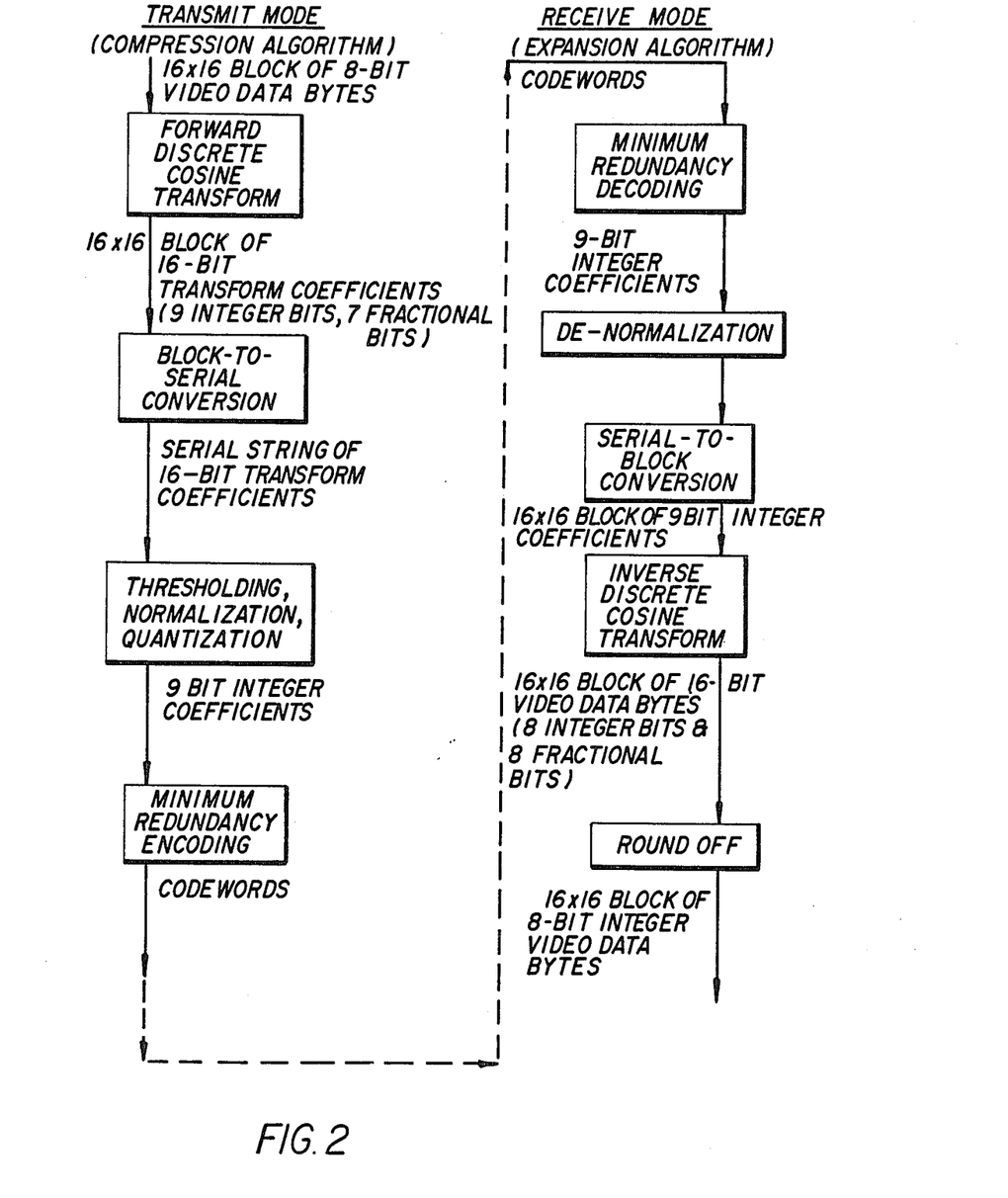
FIG. 2 is a flow diagram illustrating the video compression algorithm employed in the perferred embodiment of the invention.

When the video transceiver of FIG. 1 operates in the transmission mode, the compression processor 2 performs a compression algorithm (illustrated in FIG. 2). When the video transceiver of FIG. 1 operates in its receive mode, it executes an expansion algorithm (also illustrated in FIG. 2).

The compression algorithm of FIG. 2 begins with the discrete cosine transforming of each successive block of the video data to generate a corresponding block of cosine transform coefficients. The cosine transform coefficients are then rearranged in serial order by a block-to-serial conversion step best illustrated in FIG. 3. The block-to-serial conversion step consists of arranging the discrete cosine transform coefficients in order of increasing spatial frequency, which corresponds to the zig-zag pattern of FIG. 3. The resulting serial string of transform coefficients is then subject to thresholding, normalization, quantization and minimum redundancy encoding (described previously on page 1 hereof).

As mentioned previously, each of the steps of the compression (or expansion) algorithm of FIG. 2 requires a significant amount of computer processing time, so that the problem is how to reduce the amount of time required to perform the compression (or expansion) algorithm of FIG. 2.

Compression of Video Block Pairs

Referring again to FIG. 1, the compression processor 2 reduces the amount of processing time by dividing the uncompressed video data held in the frame store memory 4 into a plurality of blocks (as indicated in FIG. 1), by fetching successive pairs of these blocks during each process cycle and by processing the block pairs together. To this end, the compression processor 2 consists of a microprocessor 20, which performs the data fetching and storing tasks, a dual port memory 22 and a digital signal processor 24. The microprocessor 20 accesses the dual port memory 22 through a first port 22a while the digital signal processor accesses the dual port memory 22 through a second port 22b.

Significantly, the compression algorithm of FIG. 2 is divided into two portions, the first portion to be executed by the digital signal processor 24 and the second portion to be executed by the microprocessor 20. Because both microprocessors may access the dual ports 22a, 22b simultaneously, the two processors 20, 24 may operate in parallel on different ones of the pair of blocks of video data held in the dual port memory 22. This parallel processing results in significant savings in processing time.

In an exemplary embodiment of the invention, the digital signal processor 24 performs the discrete cosine transform portion of the compression algorithm while the microprocessor 20 performs the remainder of the compression algorithm of FIG. 2. Thus, after two blocks of video data have been selected from the frame store memory 4 and loaded into the dual port memory 22, the digital signal processor performs the discrete cosine transform on the first of the two blocks and returns it to the dual port memory and then fetches the second of the pair of blocks. In the meantime, the microprocessor 20 fetches the first of the two blocks which has been returned by the digital signal processor 24 to the dual port memory 22 and performs the remainder of the compression algorithm of FIG. 2 on this block (while, simultaneously, the digital signal processor 24 performs the discrete cosine transform on the other block). Both processors 20, 24 return the respective blocks back to the dual port memory when they are finished with their appointed tasks. In this manner, the processors 20, 24 operate in tandem through the independent ports 22a, 22b of the dual port memory 22 until both data blocks have been processed by both processors 20, 24. At this point, both blocks have been fully "compressed" and may be returned to the frame store memory 4. Then, the next pair of blocks of video data is fetched from the frame store memory 4, and the process begins again.

Temporary Buffer

The compression process eliminates many bits contained in each block of video data, so that the compressed video data does not "emerge" from the compression processor 2 in a continuum but has "gaps". In order to assure that such compressed data is written into the frame store memory 4 in a smooth, continuous fashion, the compressed data is first held in a temporary buffer 26 illustrated in FIG. 1. The data is accumulated in the temporary buffer 26 until an amount exceeding a predetermined amount (typically, one byte) resides in the temporary buffer 26, at which time one byte of the compressed data therein is unloaded and stored in the frame store memory 4. The temporary buffer 26 may be implemented as a random access memory comprising plural addressable memory locations.

Frame Store Memory

Typically, the frame store memory 4 is divided into two portions, an image buffer 4a and a compressed image buffer 4b. The image buffer stores bytes of uncompressed digital video data, the bytes individually representing the amplitudes of the video pixels of one video frame. If the image buffer 4a contains data representing an NTSC video frame, then it contains about 250,000 bytes. The compressed image buffer 4b need have only about ¼ the memory capacity of the image buffer 4a by virtue of the data compression achieved by the compression processor 2. The memory location to be written into or read from during each memory access cycle is defined in the image buffer 4a by an "image buffer address pointer" and in the compressed image buffer by a "compressed buffer address pointer".

Compression Processor Architecture

Figure 4:
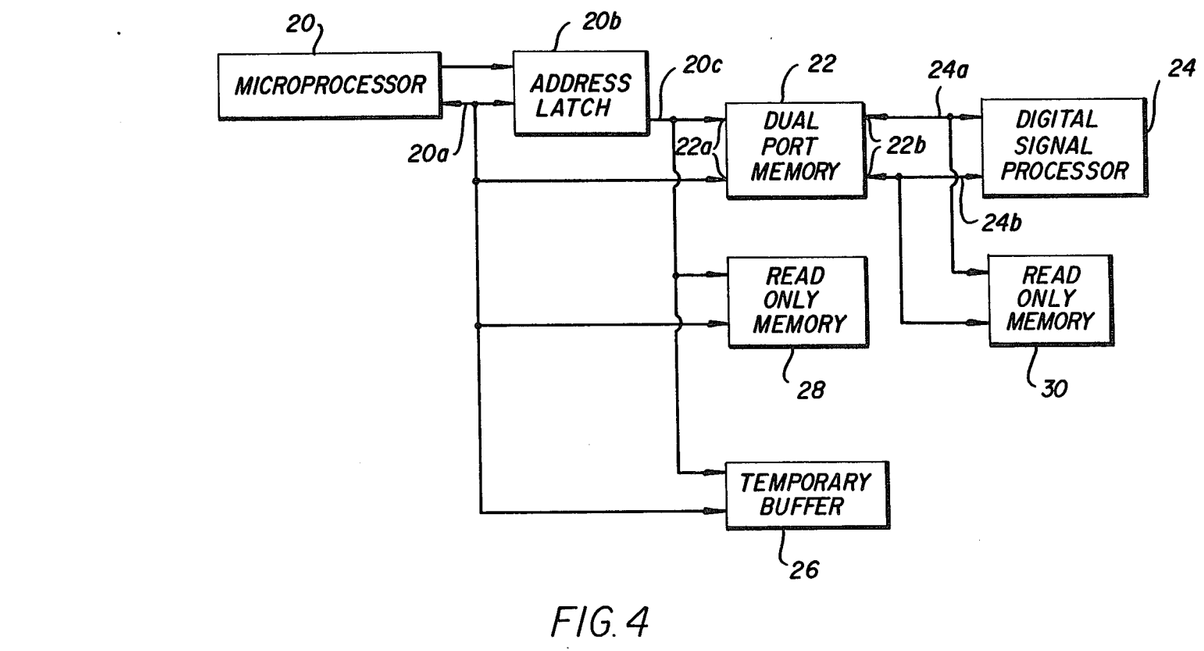
FIG. 4 is a block diagram of a compression processor in the video transceiver of FIG. 1.

Referring to FIG. 4, a data bus 20a connects the microprocessor 20 to the temporary buffer 26, the memory port 22a and a read-only-memory 28. An address latch 20b controlled by the microprocessor 20 produces address words on an address bus 20c connected to the memory port 22a, the temporary buffer 26 and the read-only-memory 28. The read-only-memory 28 stores the minimum redundancy code look-up tables used by the microprocessor 20.

The digital signal processor 24 produces address words on an address bus 24a connected to the memory port 22b and to a digital signal processor read-only-memory 30. The memory port 22b is connected via a data bus 24b to the digital signal processor 24 and to the read-only-memory 30. The read-only-memory 30 contains microcoded instructions defining the algorithms (including the discrete cosine transform algorithm) performed by the digital signal processor 24.

In the preferred embodiment of the invention, the microprocessor 20 is an Intel 80186 microprocessor integrated circuit, the temporary buffer 26 is a Hitachi random access memory, the read-only-memory 28 is a Hitachi read-only-memory, the dual port memory 22 is an AMD 2130 10 PC dual port random access memory, the digital signal processor 24 is a Texas Instrument TMS 32020 digital signal processor and the serial port controller 6 is an Intel 8274 Serial Port Controller.

Image Buffer Memory Architecture

Referring to FIG. 1, the video data stored in the image buffer 4a is organized in the manner of a television picture, namely in vertical columns and horizontal rows of video data bytes (representing the corresponding image pixels) divisible into square blocks of bytes, each block comprising 16 columns and 16 rows of bytes. The microprocessor 20 fetches a pair of the blocks and stores them in the dual port memory 22 each time the compressor processor 2 is about to execute the compression algorithm.

Dual Port Memory Architecture

Figure 5:
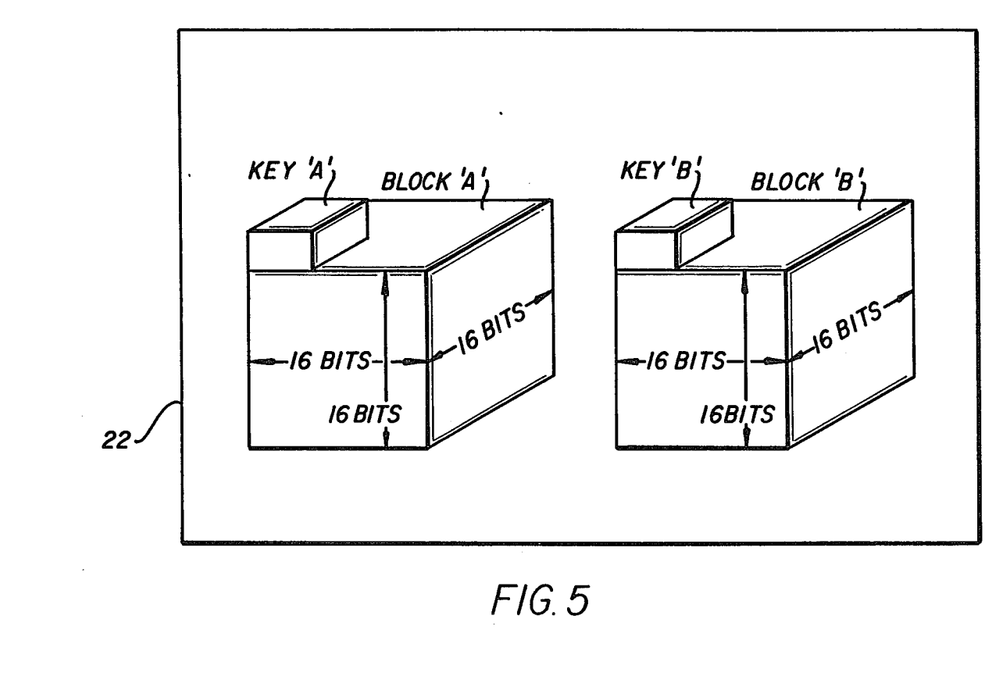
FIG. 5 is a simplified block diagram illustrating the architecture of a dual port memory in the compression processor of FIG. 4.

The memory architecture of the dual port memory 22 is shown in FIG. 5. The two blocks stored in the dual port memory 22 are labeled block A and block B, respectively. Each block is assigned its own individual space in the dual port memory 22, depicted in FIG. 5, 16 columns "wide" and 16 rows "high" and 16 bits "deep". The depth of 16 bits (two bytes) is required even though the uncompressed video data fetched from the image buffer 4a is only one byte (eight bits) "deep" because the discrete cosine transform generates 16 bit transform coefficients from the 8 bit input words, and these transform coefficients must be accommodated at least temporarily in the dual port memory 22 during execution of the compression algorithm.

Dual Port Parallel Processing

In FIG. 5, a one-byte memory location labeled "key" is appended to each block location in the dual port memory 22. The contents of each key location reflects the processing status of the corresponding block and is changed in a unique manner shown in Table 1 by each of the processors 20, 24 whenever that processor is finished processing that particular block. In effect, the dual processors 20, 24 "shake hands" across the dual port memory 22 through the two key locations in the dual port memory 22.

TABLE 1

| Transmission Mode Forward Transform and Compression | | Receiving Mode Expansion and Inverse Transform | |
|---|---|---|---|
| Key Loc. Value | Definition | Key Loc. Value | Definition |
| F00FH | Written by the microprocessor indicating to the DSP processor that the data block is waiting to be forward-transformed. | 0F0FH | Written by the microprocessor indicating to the DSP processor that the data block has been expanded and is waiting to be inverse transformed. |
| FFFFH | Written by the DSP processor indicating to the microprocessor that the data block is being transformed but is not ready yet. | FFFFH | Written by the DSP processor indicating to the microprocessor that the data block is being transformed but is not ready yet. |
| 0100H | Written by the DSP processor indicating to the microprocessor that the data block has been forward-transformed and is waiting to be compressed. | 0FFFH | Written by the DSP processor indicating to the microprocessor that the data block has been inverse transformed. |

Table 1 defines the preferred hexidecimal values written into the key locations with the occurrence of certain events during execution of the transmission mode and receiving mode algorithms of FIG. 2. Table 1 shows that, at each "hand-off" of one of the pair of blocks stored in the dual port memory from one processor 20, 24 to the other, the key location value is changed to notify the other processor, and thus avoid one of the processors 20, 24 accessing one of the two blocks out of sequence, while at the same time enabling parallel processing of the pair of blocks, significantly reducing the amount of processing time required to compress (or expand) the two blocks stored in the dual port memory.

During the transmission mode, the microprocessor 20 begins compressing one of the two blocks only if that block has a key location value 0100H and, in the receiving mode, expands one of the two blocks only if the key location value of that block is FFFFH. In the transmission mode, the digital signal processor 24 forward transforms a block only if the key location value of that block is F00FH, and, in the receiving mode, inverse transforms a block only if the key location value of that block is 0F0FH. (The "H" in all of these numbers is merely a label signifying that they are hexidecimal numbers.)

Dual Processing Sequence

Figure 6:
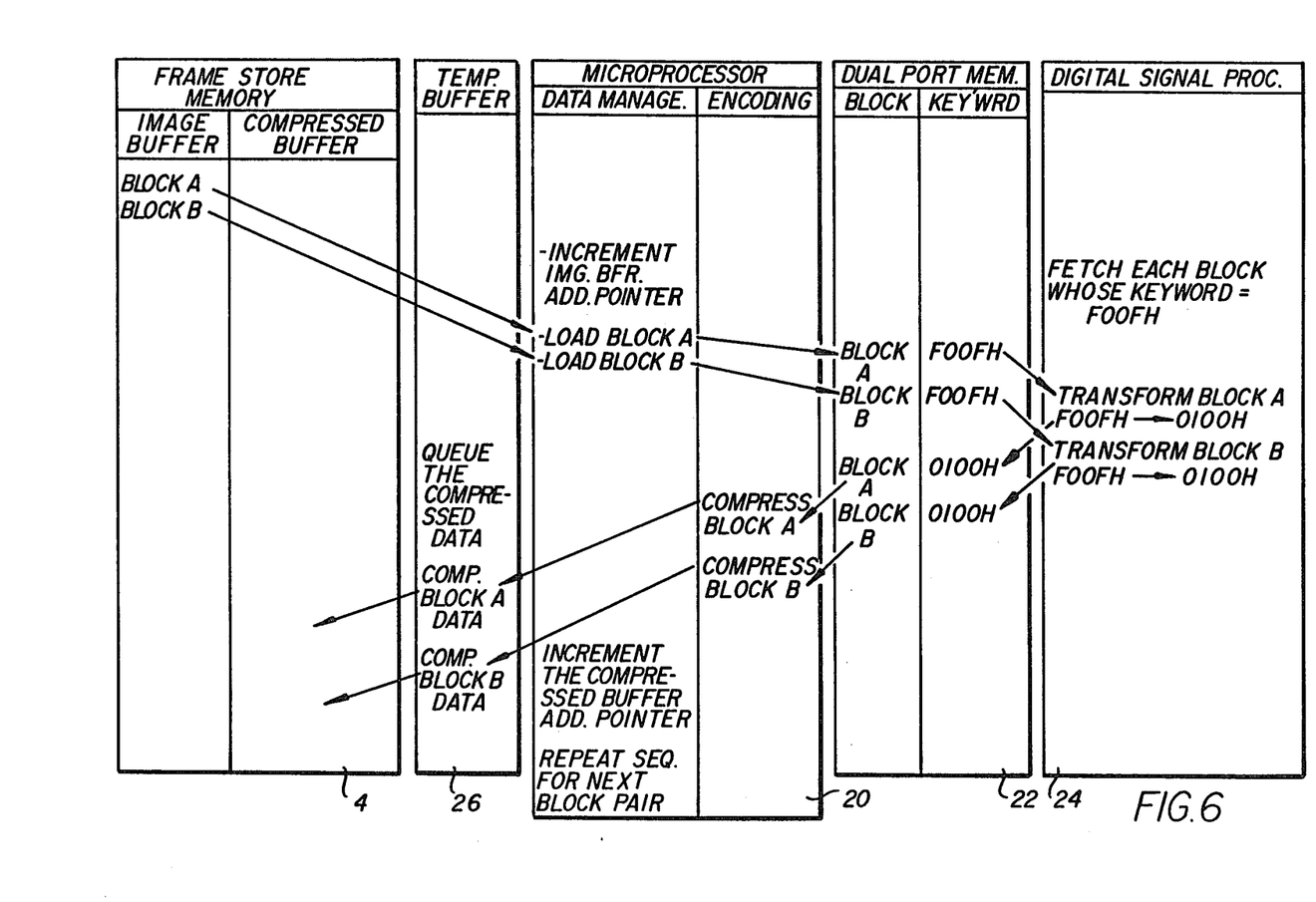
FIG. 6 is a flow diagram illustrating the operation of the compression processor of FIG. 4.

The sequence of operations implementing the transmission mode compression algorithm of FIG. 2 in accordance with Table 1 is illustrated in FIG. 6. It is understood that the "reverse" of this sequence implements the receiving mode expansion algorithm, and so only the transmission mode sequence need be described in detail.

The microprocessor 20 performs the first step in the transmission mode sequence of FIG. 6. It increments the image buffer address pointer, which defines the location in the image buffer 4a in the frame store memory 4 of the next pair of blocks (blocks "A" and "B"). Then, the microprocessor 20 fetches blocks A and B from the frame store memory 4 and loads them into the dual port memory 22 through the port 22a. The microprocessor 20 also sets the key location value of each of the two blocks in the dual port memory to the appropriate value given in Table 1, F00FH.

The microprocessor 20 and the digital signal processor 24 are programmed to fetch whatever block has a key location value of 0100H and F00FH, respectively. Accordingly, the digital signal processor 24 fetches the first block (block A) from the dual port memory 22 through the port 22b and transforms block A with a forward discrete cosine transform. Also, the digital signal processor 24 writes into the key location of block A the value FFFFH. Thereafter, the digital signal processor 24 returns the transformed version of block A to the dual port memory 22 through the dual port 22b and changes its key location value to 0100H. Then, the microprocessor 20 (responding to this last change in the key location value) fetches the transformed version of block A from the dual port memory through the port 22a while the digital signal processor 24 fetches block B from the dual port memory through port 22b. The digital signal processor 24 performs the same transformation process with block B as it did previously with block A.

Simultaneously, the microprocessor 20 compresses the transformed version of block A by performing the block-to-serial conversion step, the thresholding, normalization and quantization steps and the minimum redundancy encoding step of the transmission mode compression algorithm of FIG. 2.

The compressed data thus generated by the microprocessor 20 from the transformed version of block A is loaded sequentially into the temporary buffer 26, where it is queued. The microprocessor 20 increments the compressed buffer address pointer to the next available (empty) byte location in the compressed buffer 4b. Then, the microprocessor 20 unloads one byte of data from the temporary buffer 26 and loads it into the compressed buffer 4b at the memory location indicated by the compressed buffer address pointer. This queuing and unloading process continues in the temporary buffer as long as compressed data is generated by the microprocessor 20. This same process is repeated with block B.

Working Example

A working example of the transmission mode compression algorithm will now be described in connection with FIG. 2 and FIGS. 7a through 7d. The compression algorithm is applied to a block consisting of 16 columns and 16 rows of 8-bit video data bytes, each having a range of 0 to 255. Referring to FIG. 2, this block is transformed into a corresponding array of discrete cosine transform coefficients, comprising 16 rows and 16 columns of such coefficients. Each of the coefficients comprises a 16 bit word having nine integer bits and seven fractional bits, having a range of −256 to +255.

Figure 3:
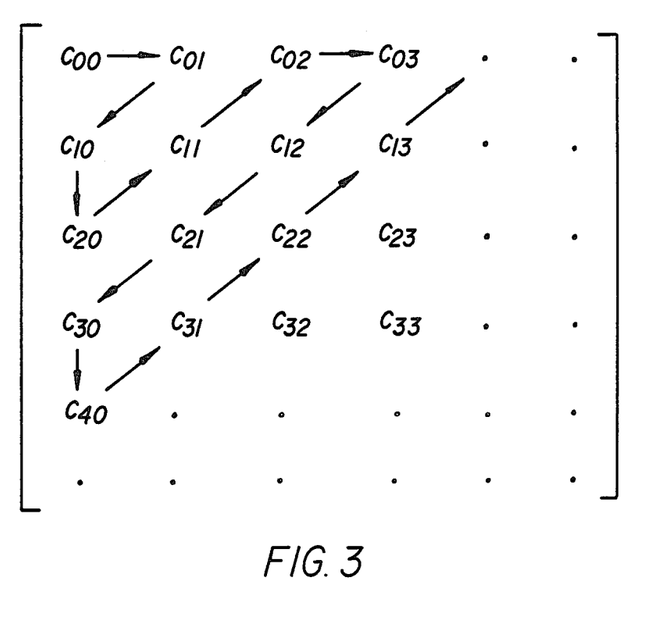
FIG. 3 is a block diagram illustrating a block-to-serial data conversion performed in the algorithm of FIG. 2.

The block-to-serial conversion step of FIG. 2 consists of fetching each of the 16-bit transform coefficients from the dual port memory 22 in the order corresponding to the zig-zag pattern of FIG. 3, beginning with the lowest order coefficient and ending with highest order coefficient.

The thresholding step discards those 16-bit coefficients having a value less than a certain threshold amount T. The normalization step divides each 16-bit transform coefficient by a normalization divisor. The normalization process, in effect, increases (or decreases) the number of fractional bits in the 16-bit transform coefficient. The quantization step simply drops all the fractional bits of each coefficient, reducing each coefficient to an integer. If the normalization divisor is one (unity), the range of the data remains unchanged, at −256 to +255. (See FIG. 2).

Figure 7A:
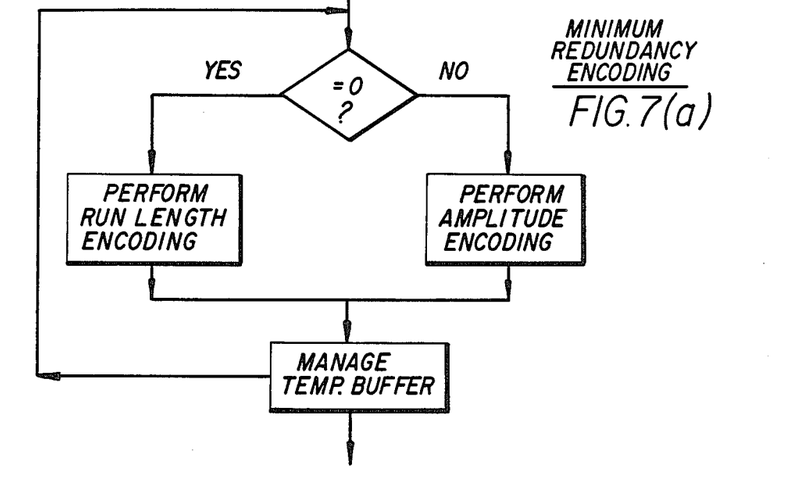
FIG. 7a is a flow diagram illustrating the minimum redundancy encoding operation performed by the compression processor.

The 9-bit integer coefficients are then minimum redundancy encoded, in accordance with an encoding algorithm illustrated generally in the block diagrams of FIGS. 7a through 7d. In FIG. 7a, each coefficient is first inspected to determine whether it is equal to zero or not. If it is, then a run length encoding process (shown in FIG. 7c) is performed, in which the number of consecutive zeros is simply counted and stored as a single number (rather than a succession of zeros). Otherwise, the coefficient is subjected to an amplitude encoding process (shown in FIG. 7d).

Figure 7B:
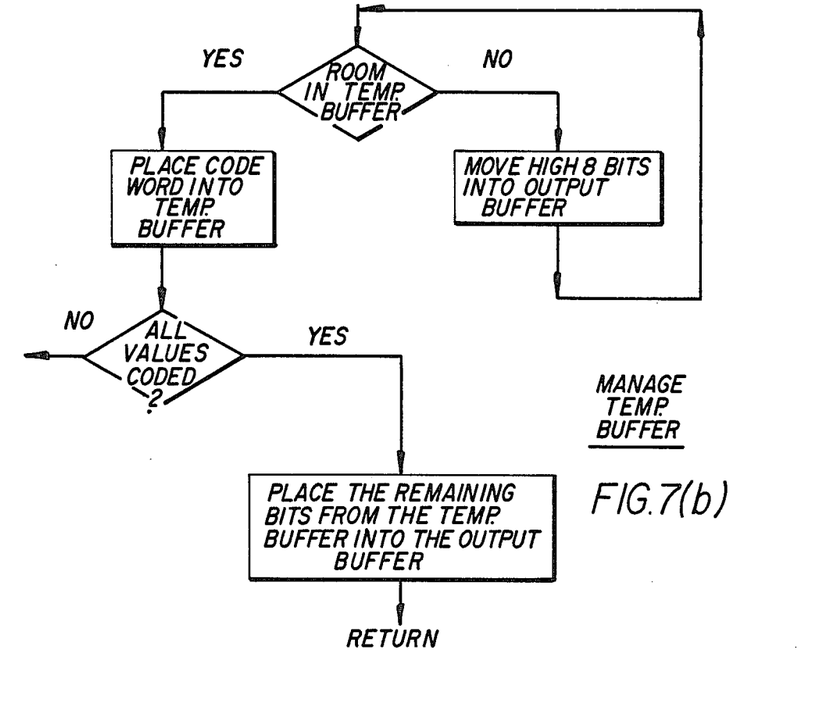

The results of the run length encoding and amplitude encoding processes are stored in the temporary buffer 26. The temporary buffer 26 is managed as shown in FIG. 7b, beginning with a determination whether there is room in the temporary buffer 26 for the compressed form of the latest transform coefficient. If not, the high 8 bits (namely the oldest byte stored in the temporary buffer 26) are removed from the temporary buffer 26 (in order to make room therein) and stored at the next available byte location in the compressed image buffer 4b. Then, the encoded form of the latest coefficient is placed into the temporary buffer. Next, a determination is made whether all the data in the image buffer 4a has been encoded. If not, the process continues. Otherwise, whatever encoded bits remain in the temporary buffer 26 are unloaded and stored in the remaining byte locations in the compressed image buffer to complete the entire process.

FIG. 7b shows that the temporary buffer 26 is a queuing device, forcing each of the encoded versions (code words) of the coefficients to form a queue which may be organized into an uninterrupted continuum of bits (notwithstanding the codewords are of various bit-lengths), to ensure smooth byte-by-byte write addressing of the compressed image buffer 4b. Thus, as each byte of code words is unloaded from the temporary buffer 26, an address pointer defining the write location in the compressed image buffer 4b is incremented by a distance in memory equal to 8 bits, or one byte, and this distance never changes, thus vastly simplifying the task of addressing the compressed image buffer 4b. Without this feature of the invention, the varying bit-lengths of the various code words would inevitably lead to sporadic gaps in the compressed data, making difficult the writing of such data into the compressed buffer 4b.

Figure 7C:
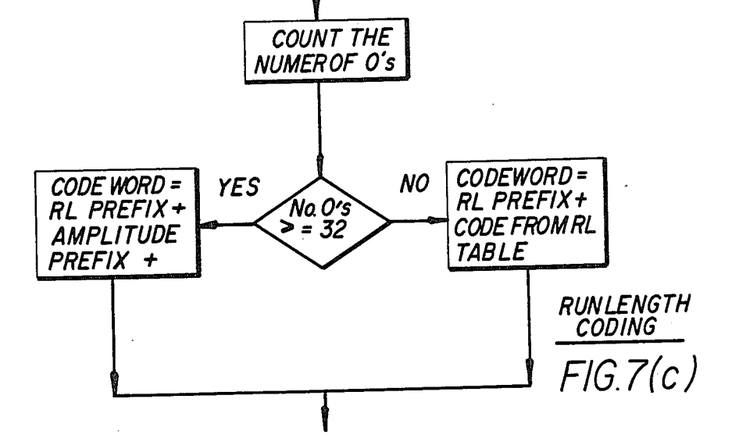

In accordance with well-known minimum redundancy encoding techniques, the run length encoding process of FIG. 7c counts the number of consecutive coefficients whose amplitude is zero, as a single run length. If the run length is less than 32, the number of zeros is simply encoded as a code word comprising a prefix—signifying a zero run—and a bit pattern defining to the run length, specified in a run length look-up table stored in the read-only-memory 28. (The run length look-up table may be constructed in accordance with principles well-known in the art and within the discretion of the skilled worker.) If the run length is equal to or greater than 32, the codeword is the run length prefix plus an amplitude prefix (specifying that the run length exceeds the value 32) plus 8 bits which equal the actual run length.

Figure 7D:
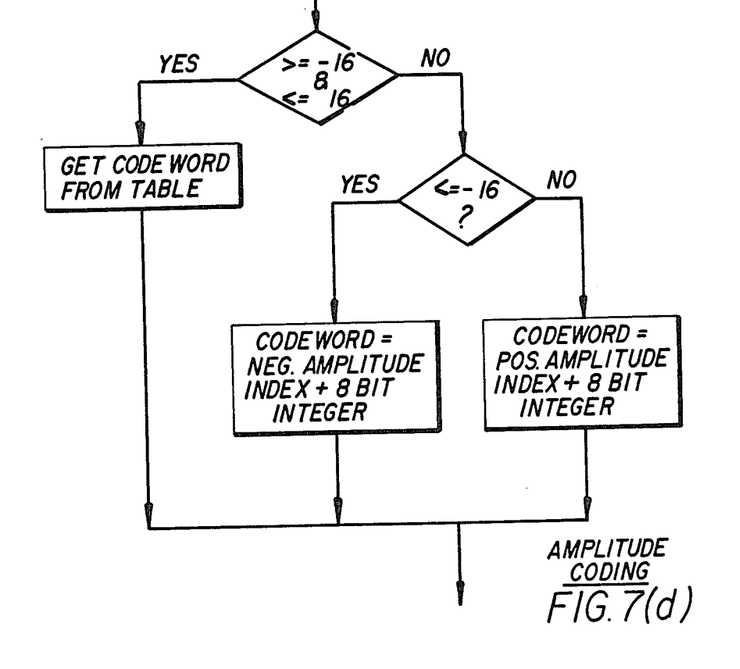

In the amplitude encoding process of FIG. 7d, each non-zero coefficient is inspected to determine whether its amplitude lies within the range of an amplitude encoding table stored in the read-only-memory 28. (In this example, the range is from −16 to +16.) If the coefficient lies within that range, then the corresponding codeword is transmitted from the read-only-memory 28 to the temporary buffer 26. If, on the other hand, the coefficient does not lie within this range, a determination is then made whether it lies above or below the range. If the coefficient's amplitude lies below or above the range, the codeword is defined as a negative or positive amplitude index, respectively, and an 8 bit integer equal to the actual amplitude of the coefficient.

External Computer Control Port And Local Area Network

An extra serial port 50 may be provided for the microprocessor 20 which allows an external computer to access the main control software of the microprocessor 20. This feature provides for image storage at the external computer 52 as well as image transmission through the serial port controller 6.

(1) Still video images can be captured in digital form expanded and stored in the image buffer 4a.

(2) This uncompressed image in the image buffer 4a can be downloaded through the serial port 50 for storage or manipulation at the external computer 52.

(3) A digital image can be unloaded through the serial port 50 from the external computer 52 and stored in the image buffer 4a.

(4) A compressed video image can be downloaded from the compressed buffer 4b through the serial port 50 for storage at the external computer 52.

(5) A compressed image can be uploaded through the serial port 50 from the external computer 52 and stored in the compressed buffer 4b.

(6) Two video transceivers of the type shown in FIG. 1 allow communication between two external or personal computers 52, 52' in the manner of a high quality still video "local area network" shown in FIG. 1. They further allow each external (personal) computer 52 or 52' to control a remote still video floppy player/recorder or thermal printer or other video peripheral through the corresponding video transceiver.

(7) The external computer 52 may provide "telephone" functions for the microprocessor 20 such as auto-dialing, auto-answer, and creating a telephone number directory.

While the invention has been described in detail with reference to preferred embodiments thereof, it will be understood that variations and modifications thereof may be made without departing from the spirit and scope of the invention.

What is claimed is:

1. A still video transceiver, comprising:
   a digital video frame store memory adaptable to store plural blocks of video data;
   a dual port memory having first and second memory ports;

means for fetching dual blocks of video data from said frame store memory and for loading said dual blocks into said dual port memory;

digital signal processor means for accessing through said first memory port and discrete cosine transforming each one of said dual blocks to generate a corresponding block of transform coefficients;

data processing means for accessing through said second port and compressing each block of said transform coefficients to generate a batch of compressed transform coefficients therefrom, whereby said digital signal processing means and said data processing means may operate virtually simultaneously upon different respective ones of said dual blocks.

2. The video transceiver of claim 1 wherein said the individual transform coefficients in said batch of compressed transform coefficients are of various bit-lengths, said transceiver further comprising temporary buffer means for queuing said compressed transform coefficients into an uninterrupted continuum of bits, so as to enable continuous byte-by-byte writing of said data into said compressed image buffer.

3. The video transceiver of claim 1 wherein said dual port memory further comprises means for storing a pair of key values at a pair of key locations individually associated with said pair of blocks, and wherein said digital signal processing means further comprises means for changing one of said key values to a predetermined value whenever said digital signal processing means has processed the corresponding one of said blocks, and wherein said data processing means comprises means for changing one of said key location values to another preselected value whenever the corresponding one of said blocks has been processed by said data processing means, and wherein each of said processing means fetches a given one of said dual blocks from said dual port memory only when the corresponding key location value equals a predetermined value, so as to assure that said blocks are processed in the proper sequence.

4. The video transceiver of claim 1 wherein said data processing means performs minimum redundancy encoding and wherein said transceiver further comprises the following compression processing means which are allocated among said compression processing means and said digital signal processing means:
(a) means for rearranging the data of each of said blocks of transform coefficients into serial order;
(b) means for discarding those of said coefficients whose amplitude lies below a predetermined threshold value; and
(c) means for normalizing and quantizing each of said coefficients.

5. The still video transceiver of claim 1 further comprising a serial port connected to an external personal computer, said serial port comprising means permitting said external computer to fetch and store image data in said image buffer and compressed image data in said compressed image buffer, and to control said data processing means.

6. The video transceiver of claim 1 further comprising serial port controller means characterized by a transmission mode and a receive mode, for receiving data from said compression buffer and transmitting it over an external channel in said transmission mode, and for receiving data from said external channel for storage in said compression buffer in said receiving mode.

7. The video transceiver of claim 6 further comprising a modem connected at the interface between said serial port controller means and said external channel, said modem being adapted to provide low bandwidth data rates characteristic of dial-up telephone transmission lines and the like.

8. The video transceiver of claim 1 wherein said frame store includes an image buffer and a compressed image buffer, wherein said transceiver has two operational modes, namely a transmission mode wherein data from said compressed image buffer is unloaded and transmitted over a narrow band channel, and a receiving mode wherein data is received from said narrow band channel and stored in said compressed image buffer, and wherein said dual block grabbing means grabs said dual blocks from said image buffer during said transmission mode and grabs said dual blocks from said compressed image buffer in said receiving mode.

9. The video transceiver of claim 8 wherein said data processing means comprises:
(a) means for rearranging the data of each of said blocks of transform coefficients into a serial array of said transform coefficients;
(b) means for discarding those of said coefficients whose amplitude lies below a predetermined threshold value;
(c) means for normalizing and quantizing each of said coefficients; and
(d) means for minimum redundancy encoding said coefficients.

10. The video transceiver of claim 9 wherein said data processor means is further adapted to perform the inverse functions of said rearranging means, thresholding means, normalization and quantization means and said minimum redundancy encoding means whenever said video transceiver operates in said receiving mode.

11. In a video transceiver including a frame store memory having an image buffer for storing uncompressed image data and a compressed buffer for storing compressed image data, said video transceiver adapted to receive and transmit compressed video data over an external channel in a receive mode and a transmit mode, respectively, a parallel image processor comprising:
a dual port memory having first and second ports and means for storing rectangular blocks of video data obtained from said frame store memory and means for storing key values associated with each one of said pair of blocks;
data processing means acting through one of said first and second ports for grabbing a pair of blocks from either of said image buffer or said compressed image buffer and storing said pair of blocks in said dual port memory, and changing said key values to a first value;
transforming means acting through said first port for transforming, in accordance with a discrete cosine transform algorithm, one of said blocks stored in said dual port memory to generate a block of transform coefficients therefrom; and
encoding means acting through said second port for minimum redundancy encoding the other of said blocks stored on said dual port memory to generate a corresponding batch of compressed transformed coefficients, and then changing the corresponding one of said key values to a second value, wherein said encoding means and said transforming means are each responsive, whenever one of said location values equals a respective one of said first and second values, for accessing the corresponding one of said two blocks in said dual port memory, whereby said transforming means and said encoding means are mutually prevented from accessing out of order one of said blocks from said dual port memory.

12. The video transceiver of claim 11 wherein said frame store includes an image buffer and a compressed image buffer, wherein said transceiver has two operational modes, namely a transmission mode wherein data from said compressed image buffer is unloaded and transmitted over a narrow band channel, and a receiving mode wherein data is received from said narrow band channel and stored in said compressed image buffer, and wherein said dual block grabbing means grabs said dual blocks from said image buffer during said transmission mode and grabs said dual blocks from said compressed image buffer in said receiving mode.

13. The video transceiver of claim 11 wherein the individual transform coefficients in said batch of compressed transform coefficients are of various bit-lengths, said transceiver further comprising temporary buffer means for queuing said compressed transform coefficients into an uninterrupted continuum of bits, so as to enable continuous byte-by-byte writing of said data into said compressed image buffer.

14. The video transceiver of claim 11 wherein said dual port memory further comprises means for storing a pair of key value at a pair of key locations individually associated with said pair of blocks, and wherein said transforming means further comprises means for changing one of said key values to a predetermined value whenever said transforming means has transformed the corresponding one of said blocks, and wherein said encoding means comprises means for changing one of said key location values to another preselected value whenever the corresponding one of said blocks has been encoded by said encoding means, and wherein each of said processing means fetches a given one of said dual blocks from said dual port memory only when the corresponding key location value equals a respective one of said predetermined values, so as to assure that said blocks are processed in the proper sequence.

15. The video transceiver of claim 11 wherein said data processing means includes said encoding means and wherein said transceiver further comprises the following compression processing means which are allocated among said data processing means and said transforming means:
    (a) means for rearranging each of said blocks of transform coefficients into serial order;
    (b) means for discarding those of said transform coefficients whose amplitude lies below a predetermined threshold value; and
    (c) means for normalizing and quantizing each of said transform coefficients.

16. The video transceiver of claim 11 wherein said encoding means further comprises:
    (a) means for rearranging the data of each of said blocks of transform coefficients into a serial array of said transform coefficients;
    (b) means for discarding those of said coefficients whose amplitude lies below a predetermined threshold value; and
    (c) means for normalizing and quantizing each of said coefficients.

17. The video transceiver of claim 16 wherein said transforming means and said encoding means are adapted to perform the inverse of their respective functions whenever said video transceiver operates in said receive mode.

18. The video transceiver of claim 11 further comprising serial port controller means for receiving data from said compressed buffer and transmitting it over said external channel in said transmission mode, and for receiving data from said external channel for storage in said compressed buffer in said receiving mode.

19. The video transceiver of claim 18 further comprising a modem connected at the interface between said serial port controller means and said external channel, said modem being adapted to provide low bandwidth data rates.

20. The still video transceiver of claim 11 further comprising a serial port connectable to an external personal computer, said serial port comprising means permitting said external computer to fetch and store image data in said image buffer and compressed image data in said compressed image buffer, and to control said data processing means.

21. The video transceiver of claim 10 or 20 further comprising a second video transceiver connectable to said external channel having a second serial port connectable to a second external personal computer, whereby to provide a still video personal computer network.

* * * * *